US006164075A

United States Patent [19]

Igarashi et al.

[11] Patent Number: 6,164,075

[45] Date of Patent: Dec. 26, 2000

[54] STEAM COOLING TYPE GAS TURBINE COMBUSTOR

[75] Inventors: Kiryo Igarashi; Akio Ogose, both of Miyagi; Kouichi Akagi; Mitsuru Inada, both of Hyogo-ken, all of Japan

[73] Assignees: Tohoku Electric Power Co., Inc., Miyagi; Mitsubishi Heavy Industries, Ltd., Tokyo, both of Japan

[21] Appl. No.: 09/155,937

[22] PCT Filed: Feb. 12, 1998

[86] PCT No.: PCT/JP98/00552

§ 371 Date: Apr. 29, 1999

§ 102(e) Date: Apr. 29, 1999

[87] PCT Pub. No.: WO98/36220

PCT Pub. Date: Aug. 20, 1998

[30] Foreign Application Priority Data

Feb. 12, 1997 [JP] Japan .................................... 9-022707

[51] Int. Cl.[7] .................................. F23R 3/42; F02C 7/18

[52] U.S. Cl. ................................................ 60/752; 60/757

[58] Field of Search .............................. 60/730, 752, 757, 60/760, 39.182, 266

[56] References Cited

U.S. PATENT DOCUMENTS

| | | | |
|---|---|---|---|
| 5,724,816 | 3/1998 | Ritter et al. | 60/752 |
| 5,906,093 | 5/1999 | Coslow et al. | 60/752 |

FOREIGN PATENT DOCUMENTS

| | | |
|---|---|---|
| 62-111131 | 5/1987 | Japan . |
| 8-338633 | 12/1996 | Japan . |

*Primary Examiner*—Ted Kim
*Attorney, Agent, or Firm*—Evenson, McKeown, Edwards & Lenahan, P.L.L.C.

[57] ABSTRACT

This invention concerns the use of pressurized steam as the cooling medium in the combustor wall of a gas turbine combustor. It is distinguished by the following. The combustor wall is configured by 1) a plurality of cooling channels for cooling steam, sealed by an exterior wall panel and a heat-resistant plate which are assembled by soldering or some other method; 2) a supply manifold for supplying the cooling steam into the cooling channels, which is provided on one end of the cooling channels; and 3) a recovery manifold for recovering the cooling steam from the cooling channels, which is provided on another end of the cooling channels. This arrangement can form strong enough steam-channels that do not allow any leakage of the high pressure steam from the cooling system.

4 Claims, 4 Drawing Sheets

STEAM COOLING TYPE GAS TURBINE COMBUSTOR

This is a 371 of PCT/JP98/00552 filed Feb. 12, 1998.

INDUSTRIAL FIELD

This invention concerns a steam-cooled combustor for a gas turbine. More specifically, it concerns a structure for steam-cooling the exterior wall panels of the combustor, which are exposed to very hot combustion gases.

TECHNICAL BACKGROUND

One effective way to improve the thermal efficiency of a gas turbine is to boost the temperature at the gas inlet of the turbine. It is also desirable to suppress increased emission of $NO_x$ from the combustor, which supplies combustion gases to the turbine, and to improve the heat resistance of the turbine and its cooling capacity.

Since the combustor is exposed to temperatures of 1500 to 2000° C., it must be properly cooled so that the temperature of its exterior wall panels remains in the allowable range as it experiences thermal stress.

Generally, combustors in gas turbines are cooled by running the air to be used for combustion along their inner wall panels, and by forcing air inside these wall panels in order to cool the metal components so that their temperature is lower than that of the combustion gases.

However, if air is used to cool the turbine, the air used for cooling and the air that leaks from the cooling channels is released into the main gas flow. This air makes it more difficult to improve the capacity of the gas turbine and decrease the emission of $NO_x$.

This has led to proposals for using steam instead of air as the cooling medium.

In the past few years, combined power plants have received a great deal of publicity. These power plants make use of both gas and steam turbines in order to increase their generating efficiency (i.e., their thermal efficiency). A schematic diagram of a combined power plant is shown in FIG. 6. The gas turbine generating system comprises generator 40, compressor 41, combustor 42 and gas turbine 43. A steam turbine generating system, which comprises boiler 45, steam turbine 46, on whose output shaft 46*a* generator 40 is mounted, and steam condenser 47, is installed on the gas turbine. The exhaust gases from the gas turbine 43 are fed into boiler 45. The boiler water supplied from steam condenser 47 is heated and vaporized, and this steam is used as the drive source for steam turbine 46.

In this sort of combined power plant, there is an abundant supply of steam, which can easily be tapped, and steam has a higher thermal capacity to transmit heat than air does. Recently, engineers have been studying the use of steam instead of air as a cooling medium for the parts of the turbine that experience high temperatures. However, if the steam, which has been used to cool the hot portions of the turbine in a combined power plant, is released into the main gas flow, the temperature of the flow will drop, and the thermal efficiency of the turbine will decrease. For this reason it has been suggested that the steam used for cooling should be entirely recovered and used as drive steam for the steam turbine.

FIG. 6 illustrates how this method of steam cooling would work. As indicated by the dotted lines in the drawing, the steam generated in waste heat recovery boiler 45 is extracted and conducted to the hot portions of the combustor or other areas of the turbine which need to be cooled. All the steam used for cooling is then recovered and used as drive steam for steam turbine 46. This method enables a gas turbine 43 to be realized with a temperature at its gas inlet port in excess of 1500° C., and it also improves the overall efficiency of the combined power plant.

Although the use of steam instead of air as the cooling medium in the combustor of a gas turbine has been given a great deal of consideration, it is still at the conceptual level and has not yet been put into practice.

One reason for this is because it can be difficult to create steam-cooling channels in a combustor wall, which has complex forms, especially by a conventional laser or electrospark machining.

For steam cooling, it is necessary to use high pressure steam as a cooling medium. This demands a strong enough structure for forming the steam channels, but in fact, there is no actual structure for such a steam-cooling to fulfil this demand in the market.

There is yet another reason why there is no such steam-cooled structure in the actual market. In the steam-cooled combustor, there must be a steam supplying means and a steam recovering means around the combustor. In addition to this requirement, it is also important not to allow leakage of the steam from the steam system. It is, however, not easy to fulfil all of these requirements because of structural reasons. This made it difficult to make such a steam-cooled combustor in the actual market.

It is naturally not practical to use the same structure and the same concept used for an air-cooled combustor as a steam-cooled combustor, because it does not fulfil the requirements for steam-cooled combustor.

DISCLOSURE OF THE INVENTION

In view of this background and in response to the need for further refinement of the technology, the object of this invention is to provide a design suitable for realizing a steam cooling system.

More specifically, the object of this invention is to provide a simple structure for steam-cooling a gas turbine combustor that uses high pressure steam as a cooling medium. The structure is characterized by the configuration of 1) cooling channels which are strong enough to withstand the high pressure steam, 2) supplying means for supplying and recovering the high pressure steam, and 3) not allowing leakage of high pressure steam from the system.

To achieve the object mentioned above, in the gas turbine combustor which uses the high pressure steam as a cooling medium (steam-cooled gas turbine combustor), this invention is provided with a gas combustor wall which includes wall-mounted cooling channels. This wall is exposed to extremely hot combustion gases, so it is configured with an exterior wall panel provided with a plurality of cooling channels and a heat-resistant and durable plate which is assembled by soldering or some other method with the exterior wall panel. One end of the cooling channels is connected to a supply manifold for supplying the cooling steam, and the other end of the cooling channels is connected to a recovery manifold for recovering the cooling steam.

With such a configuration, the supply manifold and the recovery manifold are connected through the cooling channels, and the cooling steam is introduced from the supply manifold through the cooling channels and to the recovery manifold.

According to this invention, the combustor wall is actually made up of metal panels. It is, therefore, easy to manufacture the wall by press works for any kind of complex forms. In addition to this advantage, this invention can make the combustor wall strong by soldering the heat-resistant thin plate on the exterior wall panel along which many cooling channels extend. This configuration makes it possible to run the high pressure cooling steam into the cooling channels.

DESCRIPTION OF PREFERRED EMBODIMENTS

In this section a detailed explanation of several preferred embodiments of this invention will be given with reference to the drawings. To the extent that the dimensions, materials, shape and relative position of the components described in this embodiment are not definitely fixed, the scope of the invention is not limited to those specified, which are meant to serve merely as illustrative examples.

Figure 5:
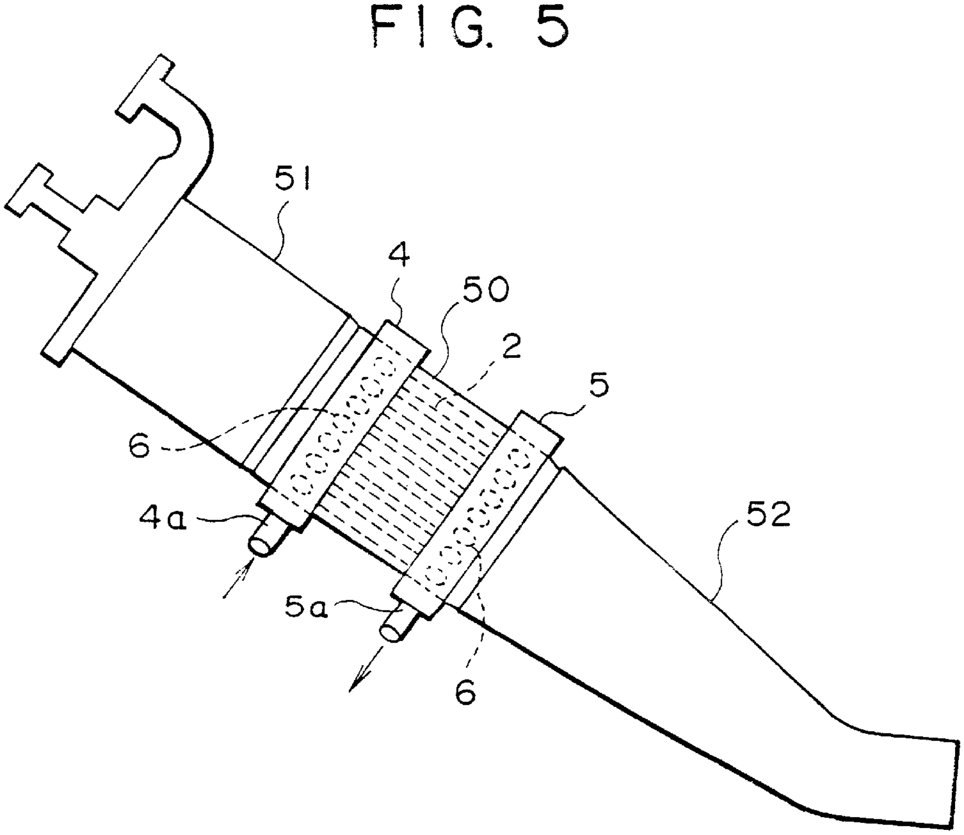
FIG. 5 shows a sketch of a gas turbine combustor, which is a preferred embodiment of this invention.

In a gas turbine plant, several combustors of the sort described earlier, with a combustion nozzle 51 on the gas inlet side of combustion chamber 50, as shown in FIG. 5, and a tailpipe 52 on the gas outlet side, are provided inside a cylindrical casing (not shown). The casing is pressurized using compressed air from a compressor. These combustors are arranged around the circumference of the casing. The combustion gases generated in chamber 50 are conducted to the turbine via tailpipe 52 and used to drive the turbine.

Figure 6:
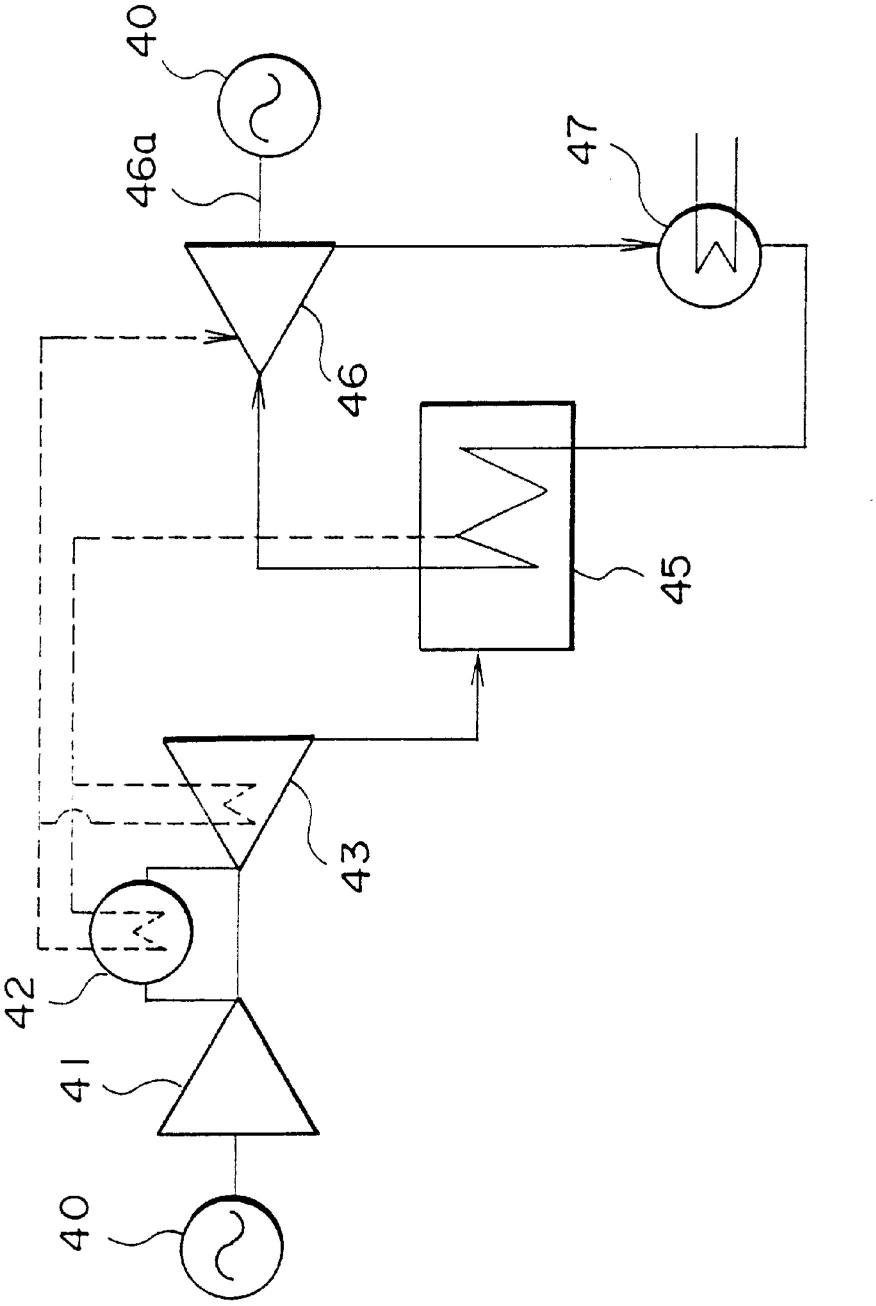
FIG. 6 shows how steam-cooling can be applied in a combined power plant in which a gas turbine is combined with a steam turbine.

As can be seen in FIG. 5, the combustor, which is a preferred embodiment of this invention, has on the peripheral surface of the combustion chamber 50 an annular supply manifold 4 on the gas outlet or inlet side of the chamber. The manifold has a peripheral wall panel whose cross section is either semicircular or rectangular. There is a recovery manifold 5 of the same design on the peripheral surface of the combustion chamber 50, and it is on the gas inlet or outlet side of the chamber. In FIG. 6, the steam generated by waste heat recovery boiler 45 is used as the energy that drives steam turbine 46. On the other hand, the steam extracted by said boiler 45 is then conducted via pipes 4*a* to supply manifolds 4. Recovery manifold 5 recovers the steam after it passes through cooling channels 2 and cools combustion chamber 50 and transports the recovered steam via recovery pipe 5*a* to the inlet of steam turbine 46.

It is not always necessary to provide one supply manifold for each recovery manifold. There can be a plurality of pairs of supply and recovery manifolds, or one supply or recovery manifold can be associated with a plurality of recovery or supply manifolds, respectively, each of which is connected by the cooling channels depending on the combustor scale.

A detailed explanation of the configuration of the cooling wall panels between the supply manifold 4 and recovery manifold 5, will next be given with reference to FIGS. 1 through 4. In exterior wall panel 1 of the wall of the combustor, a number of channels 2 for the cooling steam are laid out parallel to each other on the inner surface (the undersurface) of the wall panel. A separate thin heat-resistant plate 3 is soldered to the undersurface across which these channels extend. The combustion gases, represented by the white arrow, flow under plate 3.

Figure 1:
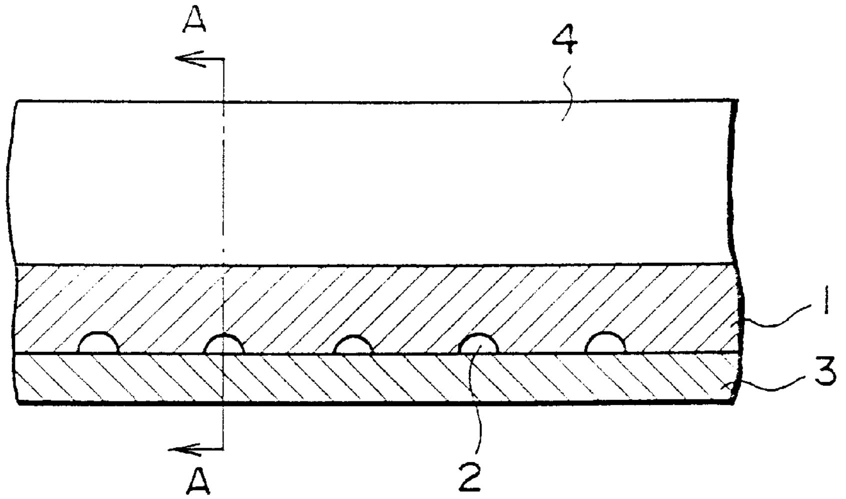
FIG. 1 is a cross section of a cooling channel for a gas turbine combustor, which is a preferred embodiment of this invention.
Figure 2:
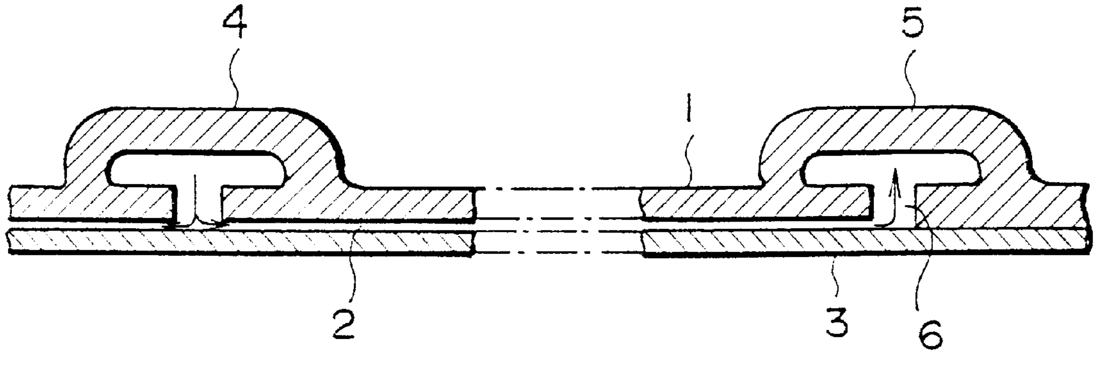
FIG. 2 shows a cross section of a steam-cooled wall panel in the combustor of a gas turbine taken along line A—A of FIG. 1. It shows the structure for the cooling wall panel, which conducts the steam from the supply manifold to the recovery manifold through the cooling channels.
Figure 3:
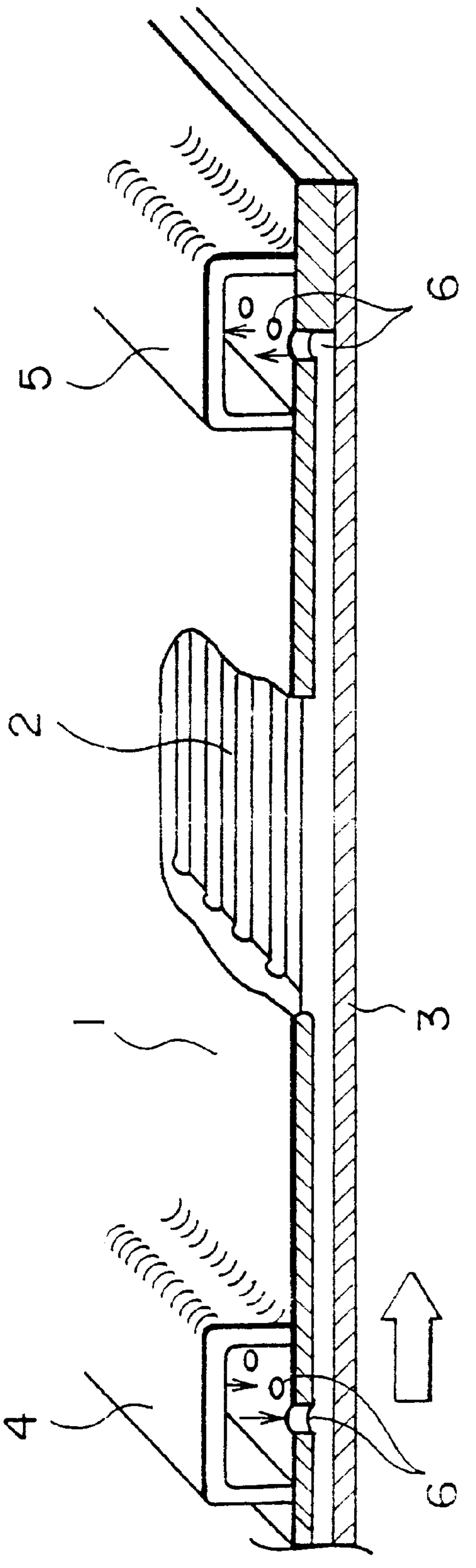
FIG. 3 is a perspective drawing of the cooling wall panel, which is a preferred embodiment of this invention. This drawing combines the features shown in FIGS. 1 and 2.

Numerous through holes 6 are provided on the surface of exterior wall panel 1 around the circumference of the chamber. These holes are in the locations where supply manifold 4 and recovery manifold 5 are mounted at both ends of channels 2. The holes 6 may be staggered to the left and right in a zigzag pattern as shown in FIG. 4, or they may be arranged in a row as is shown in FIG. 3.

Figure 4:
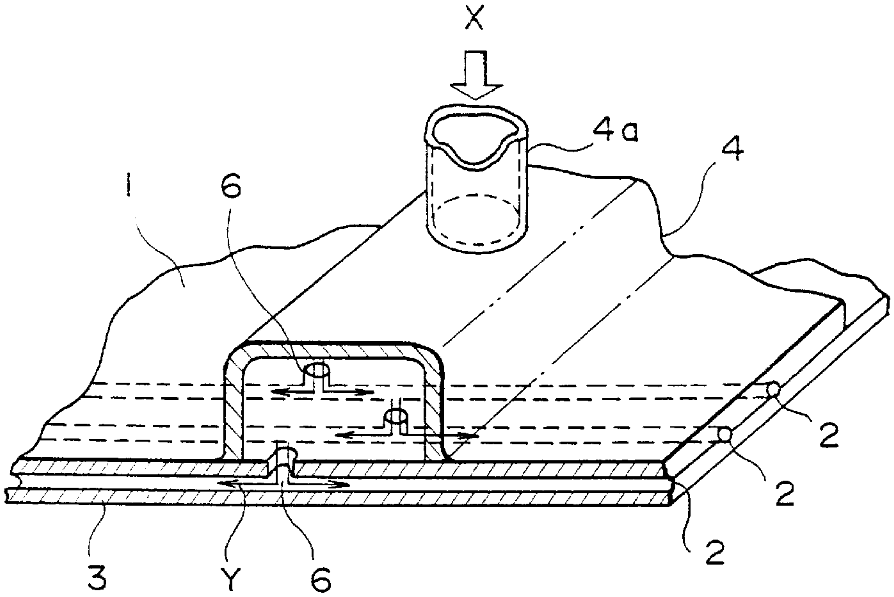
FIG. 4 shows a detailed drawing of the supply manifold shown in FIGS. 2 and 3, which is a preferred embodiment of this invention.

A detail view of the supply manifold 4 is shown in FIG. 4. Supply manifold 4 is formed by attaching a channel-shaped piece to wall panel 1 in the location that faces the through holes 6. The steam for cooling the chamber is supplied via pipe 4*a*, which feeds into the channels in the appropriate place, from a source such as recovery boiler 45 inparallel with gas turbine 43. This steam passes through hole 6 in the exterior wall panel 1 and is supplied to the channels 2, which are between wall panel 1 and plate 3, as shown by the solid arrows in FIG. 4.

A detailed description of recovery manifold 5, which is configured identically to the supply manifold 4, will not be given.

Preferably exterior wall panel 1 and plate 3, which constitute the steam-cooled wall, can be composed of Hastelloy X and Tomilloy (both are registered trademarks). Exterior wall panel 1 can be 3.0 to 5.0 mm thick, and plate 3, which is soldered to the wall panel, should be 0.8 to 1.6 mm thick.

In this embodiment, then, the combustor wall comprises two panels (exterior wall panel 1 and plate 3) which have sealed channels 2 running between them. These channels 2 connect manifold 4, which supplies the cooling steam, and recovery manifold 5. As the steam supplied via manifold 4 travels through channels 2 in exterior wall panel 1, it cools the wall panel. The steam is then recovered through manifold 5.

According to this invention, all cooling-steam supplied is recovered, and no cooling-steam leaks from the system, which is a necessary feature in the steam-cooling system. This requirement is achieved in the configuration described above. This improves the capacity of the gas turbine 43 and reduces its emission of $NO_x$.

In the preceding, the present invention has been discussed using a preferred embodiment; however, the invention is not limited to this embodiment only. It should not be necessary to state that various modifications may be made to the actual configuration as long as it remains within the scope of the invention.

The cooling channels described above are provided on the exterior wall panel 1, but it is possible to provide such cooling channels on plate 3 also in order to expand the transport area for the steam.

EFFECTS OF THE INVENTION

According to this invention, the combustor wall is actually made of metal panels. It is, therefore, easy to manufacture the wall by press works for any kind of complex forms.

In addition to this advantage, the greater heat resistance of the turbine allows the use of steam as a pressurized cooling medium. All the requirements for a steam-cooling system are achieved in this invention, and it improves the capacity of the gas turbine and reduces its emission of $NO_x$, thereby contributing to increased efficiency of the plant as a whole.

What is claimed is:

1. A steam-cooled gas turbine combustor arranged between a combustion nozzle and a tailpipe, said combustor having a combustor wall which is exposed on an interior side thereof to combustion gases, and in which high-pressure steam is used as a cooling medium, said combustor wall comprising:

a plurality of cooling channels for cooling steam extending parallel to each other, sealed by an exterior wall panel and a heat-resistant plate, which are assembled together so that said cooling steam flows in one direction through said parallel cooling channels;

a supply manifold for supplying said cooling steam into said cooling channels, which is provided on an inlet end of said parallel cooling channels; and a recovery manifold for recovering said cooling steam from said cooling channels, which is provided on an outlet end of said parallel cooling channels.

2. A steam-cooled gas turbine combustor according to claim 1, wherein said supply manifold is located at a gas inlet of a combustion chamber adjacent the combustion nozzle, and said recovery manifold is located at a gas outlet of said combustion chamber adjacent the tailpipe.

3. A gas turbine combustor according to claim 1, wherein said exterior wall panel and said heat-resistant plate are assembled by soldering.

4. A gas turbine combustor according to claim 1, wherein said parallel cooling channels are formed by grooves in the exterior of the combustor wall panel covered by said heat-resistant plate.

* * * * *